United States Patent [19]

Takeuchi et al.

[11] Patent Number: 4,475,640

[45] Date of Patent: Oct. 9, 1984

[54] DAMPER DISC

[75] Inventors: Hiroshi Takeuchi, Higashi-Osaka; Yoshio Nishimura, Neyagawa, both of Japan

[73] Assignee: Kabushiki Kaisha Daikin Seisakusho, Osaka, Japan

[21] Appl. No.: 329,123

[22] Filed: Dec. 9, 1981

[30] Foreign Application Priority Data

Dec. 22, 1980 [JP] Japan ............................ 55-182634

[51] Int. Cl.³ .............................................. F16D 3/14
[52] U.S. Cl. ............................ 192/70.17; 192/106.1; 192/106.2
[58] Field of Search ............... 192/55, 70.17, 106.1, 192/106.2; 464/63, 64, 81

[56] References Cited

U.S. PATENT DOCUMENTS

| 3,101,600 | 8/1963 | Stromberg | 464/63 |
| 3,414,101 | 12/1968 | Binder et al. | 192/106.2 |
| 3,534,841 | 10/1970 | Schweider et al. | 192/106.2 |
| 3,578,121 | 5/1971 | Maurice | 192/106.2 |
| 3,800,931 | 4/1974 | Maucher | 192/70.17 |

FOREIGN PATENT DOCUMENTS 1952620 7/1978 Fed. Rep. of Germany ... 192/106.2

Primary Examiner—Rodney H. Bonck
Assistant Examiner—James J. Merek
Attorney, Agent, or Firm—Armstrong, Nikaido, Marmelstein & Kubovcik

[57] ABSTRACT

The present invention relates to a damper disc suitable for large and heavy-duty friction clutch discs. The damper disc comprises a hub splined to an output shaft; axially spaced two or more annular flanges rotatably fitted to the outer periphery of the hub; annular side plates arranged at both sides of each flange; torsion springs extending substantially in the disc rotating direction and disposed in openings formed in the flanges and the side plates, each pair of the side plates being connected to the adjacent flange by the torsion springs; a torque input member connected to the flanges; one of each side plates pair being connected to the hub.

7 Claims, 6 Drawing Figures

DAMPER DISC

BACKGROUND OF THE INVENTION

The present invention relates to a damper disc suitable for large and heavy-duty friction clutch discs.

In a known type of damper disc, a pair of side plates are arranged at both sides of a flange of a hub splined to an output shaft. The side plates and the flange are connected through torsion springs fitted in openings in the side plates and the flange.

However in this known type of the damper disc, considering that the strength of the flange and the side plates is reduced by said openings, at most six (or six pairs of) torsion springs can be employed, and it is difficult to employ more than six springs. Therefore total rigidity of the whole torsion springs can not be set sufficiently large, and the torsion springs can not effectively absorb strong torque vibration. In such case that hard torsion springs are employed for absorbing the strong torque vibration, the springs strongly engage and press side edges of the openings. Therefore, the side edges of the openings and the torsion springs wear severly, resulting in low durability.

Accordingly, it is an object of the invention to provide an improved damper disc, wherein a spline hub has at least two flanges, each of which has openings for torsion springs, so that the number of the torsion springs increases.

Other and further objects, features and advantages of the invention will appear more fully from the following description of the preferred embodiments of the invention.

DETAILED DESCRIPTION OF THE PREFERRED EMBODIMENTS

Figure 1:
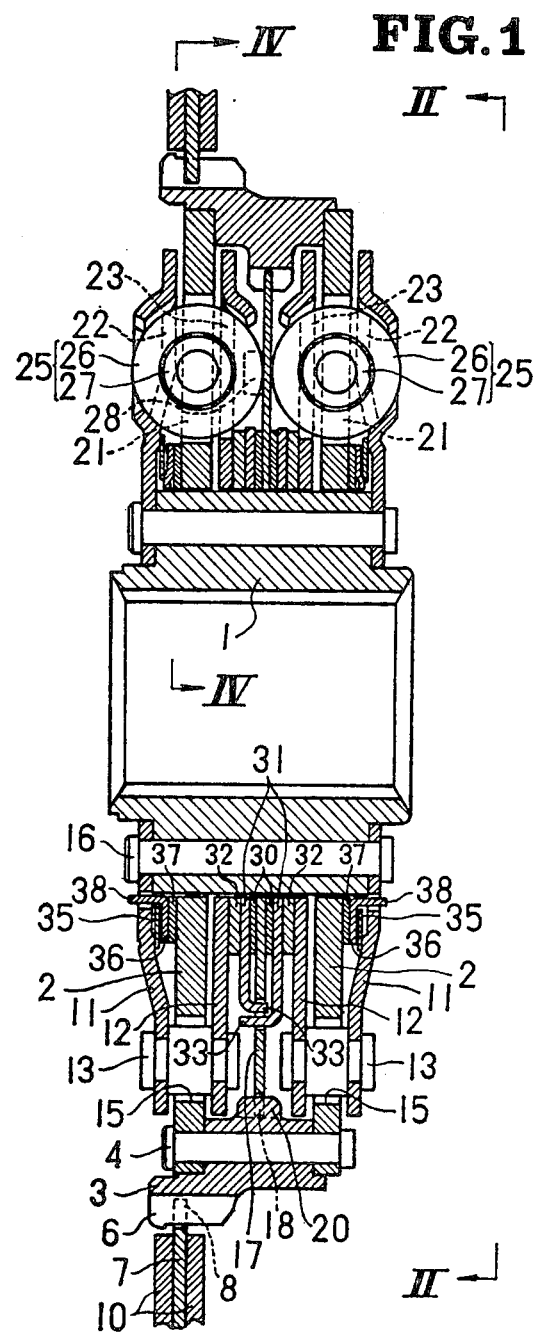
FIG. 1 is a sectional view of a clutch disc of the preferred embodiment according to the invention.

Referring first to FIG. 1, a splined hub 1 splined to an output shaft (not shown) comprises two annular flanges 2 on its outer periphery. Both flanges 2 are axially spaced to each other. The flanges 2 are formed separately to the hub 1, and rotatably engage to the outer periphery of the hub 1. A cylindrical ring gear 3 is fixed to the radially outer portions of both flanges 2 by pins 4. The ring gear 3 has outer teeth 6 which engage to inner teeth 8 without substantially any backlash therebetween. The inner teeth 8 are formed on an annular input plate 7. A pair of friction facings 10 (torque input member) are fixed to both faces of the plate 7.

A pair of annular side plates 11 and 12 are arranged at both sides of each flange 2. An outer portion of each side plate 11 is connected to the adjacent side plate 12 by stepped pins 13, which respectively pass through circumferentially long apertures 15 formed in the flanges 2. The axially outer two side plates 11 and 11 of the four side plates 11, 12, 12 and 11 are fixed at their radially inner portions by pins 16 to annular stepped portions formed at both end faces of the hub 1. The inner edges of the other two side plates 12 and 12 are rotatably fitted to the outer periphery of the hub 1. One annular center plate 17 is arranged between the side plates 12 and is rotatably fitted to the hub 1. The center plate 17 has outer teeth 18 at its outer periphery, which mesh with inner teeth 20 of the ring gear 3 with circular space or backlash (detailed hereinafter) therebetween.

Each flange 2 and the corresponding side plates 11 and 12 have substantially axially aligned openings 21, 22 and 23. A torsion spring 25 is arranged in each set of three openings 21, 22 and 23. The torsion springs 25 extend in a substantially circumferencial direction of the disc (in other words, vertically with respect to the sheet of FIG. 1). Each torsion spring 25 comprises coaxially arranged one large diameter coil spring 26 and one small diameter coil spring 27 (or 27a in FIG. 2). The center plate 17 has bent stoppers 28 which contact with, as hereinafter detailed, portions of the large springs 26 positioned left in FIG. 1 and projecting out the openings 23. The stoppers 28 are formed by partially cut and perpendicularly bent portions of the plate 17.

A wave spring 30, a sub-plate 31 and a friction plate 32 are arranged between the inner portion of each side plate 12 and the center plate 17. The wave springs 30 are pressed to the center plate 17, and the friction plates 32 are pressed to the side plates 12. Both subplates 31 have radially outward protrusions 33 at their outer edge, ends of which are bent and enter into openings in the center plate 17, so that the sub-plates 31 and the center plate 17 are prevented from relative rotation. An annular cone spring 35, a friction washer 36 and a friction plate 37 are arranged between the inner portion of each side plate 11 and the adjacent flange 2. The cone springs 35 are pressed to the side plates 11, and the friction plates 37 are pressed to the flanges 2. Each washer 36 has protrusions 38 at its inner edge, which project axially and outwardly and enter into openings in the side plates 11, so that the washers 36 and the plates 11 are prevented from relative rotation. The friction force of the friction plates 32 is set larger than that of the friction plates 37.

Figure 2:
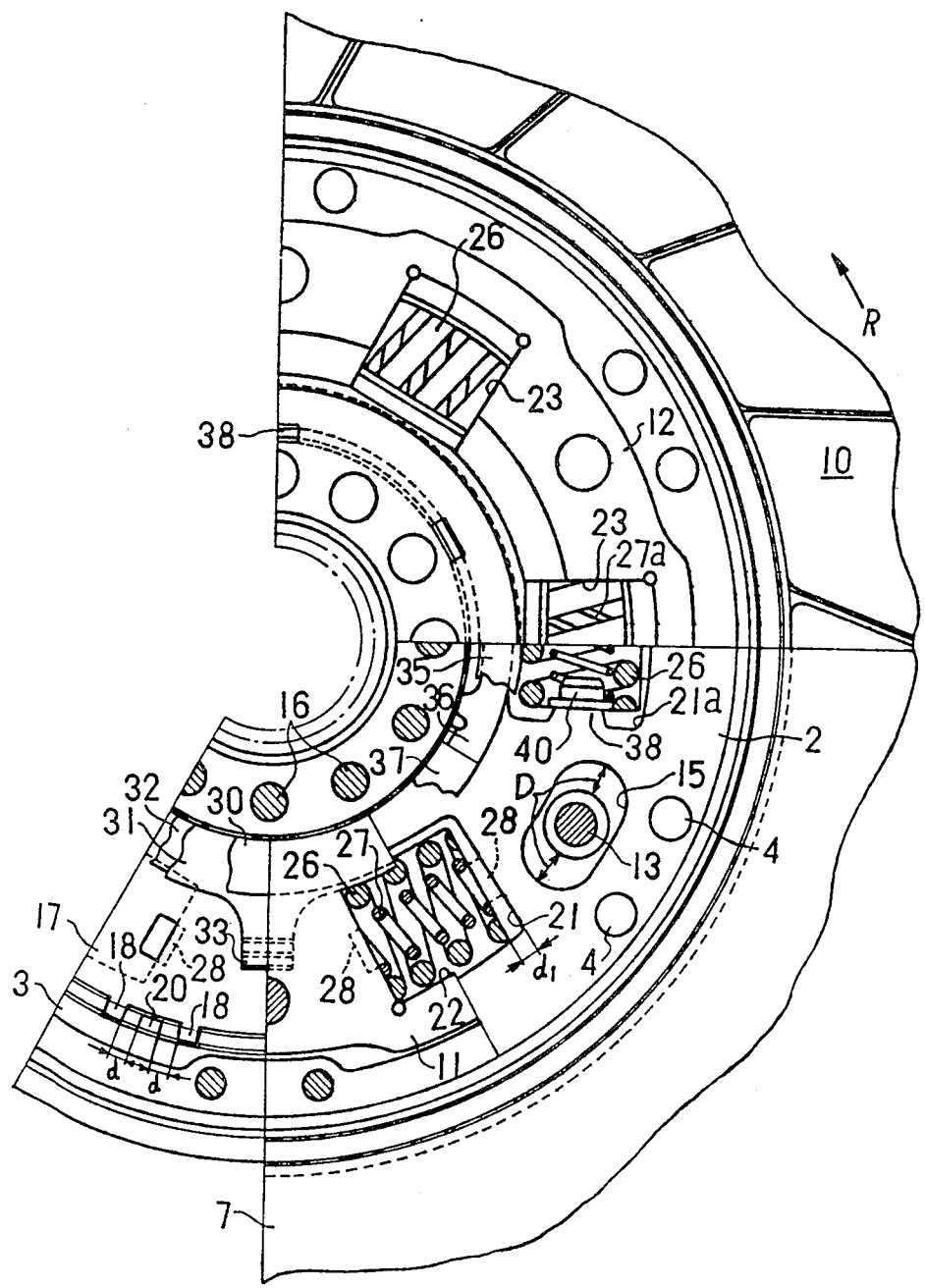
FIG. 2 is a fragmentary view of the clutch disc viewed in the direction of arrows II—II in FIG. 1, with certain parts cut away.

Referring to FIG. 2, spaces d are formed between the outer teeth 18 of the center plate 17 and the inner teeth 20 of the ring gear 3. The spaces d and other spaces detailed hereinafter are formed when torque is not transmitted through the disc and any relative turning or torsion does not occur. The spaces d correspond to a positive torsion angle of 3° and a negative torsion angle of −3°, in other words, correspond to a first torsion angle. There are six pins 13 in each flange 2 (for a total of twelve). Each pin 13 is spaced to the edges of the long aperture 15 with spaces D therebetween, which correspond to a maximum torsion angle of 5.5°.

Six pairs of springs 26 and 27 (or 27a) are arranged in each flange 2, totalling twelve pairs arranged in the disc. Six pairs of springs 26 and 27 (27a) are arranged on a same circle with constant spaces therebetween. Both ends of each spring 26 and 27 (27a) contact with the side edges of the openings 22 and 23, when the torsion angle is zero (0°). Five openings 21 of six openings 21 (and 21a) have same size. Spaces $d_1$ corresponding to the first torsion angles of ±3° are formed between the side edges of said five openings 21 and the ends of the springs 26 and 27. Both side edges of other one opening 21 have protrusions 38, which contact with spring seats 40 for the small spring 27a when the torsion angle is zero. Side edge portions of the opening 21a except the protrusions 38 are spaced to the large spring 26 with spaces corresponding to the first torsion angles of ±3° therebetween. The spring 27a is thinner than the springs 27. The stoppers 28 of the center plate 17 contact with both ends of one or more of the large springs 26, when the torsion angle is zero. The spaces $d_1$ corresponding to the torsion angles of ±3° are formed between the side edges of the openings 21 and the faces, by which the springs 26 are supported, of the stoppers 28.

In the operation, when the facings 10 in FIG. 1 are pressed to a flywheel (not shown) of an engine by a pressure plate (not shown), the torque is transmitted from the flywheel to both flanges 2 through the facings 10, the plate 7 and the ring gear 3. The torque is transmitted from the flanges 2 to both pairs of the side plates 11 and 12 through the torsion springs 25 as well as the friction plates 32 and 37 and other members, as detailed hereinafter, and further transmitted from the side plates 11 to the output shaft through the spline hub 1. In the above operation, since the springs 25 are compressed by a force corresponding to the transmitted torque, the side plates 11 and 12 twist or torsionally turn with respect to the flanges 2, and the members operates as follows.

Figure 3:
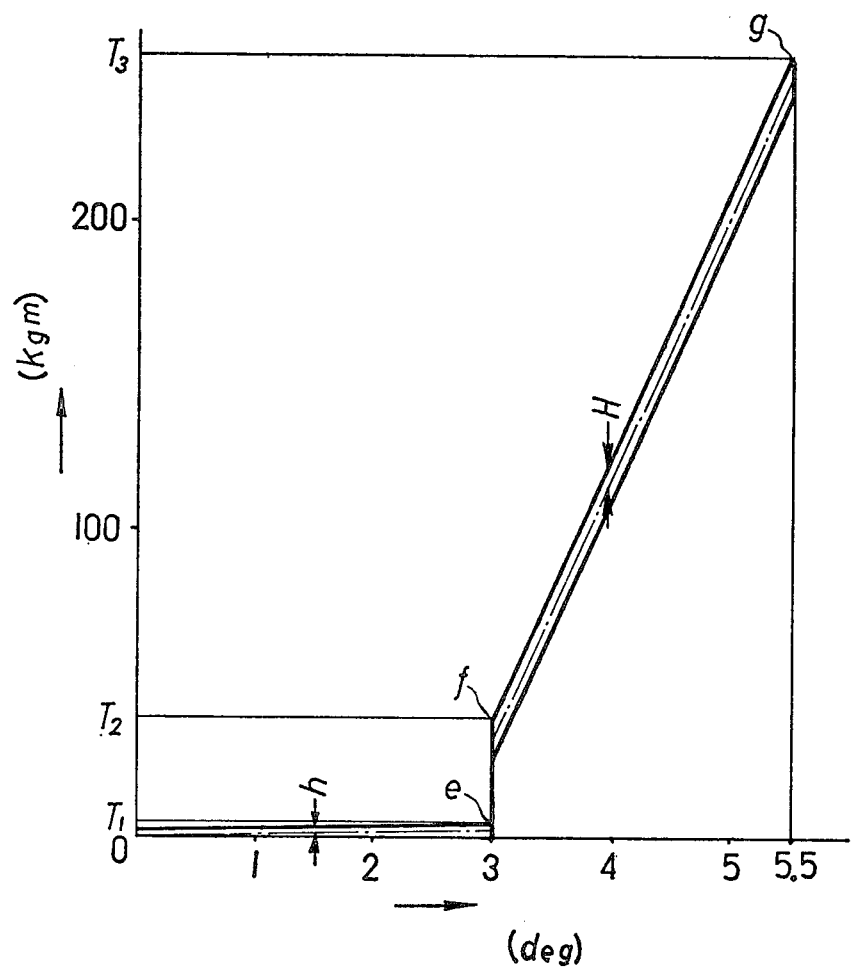
FIG. 3 is a graph explaining the relation between torque and torsion angle in the clutch disc of the invention.
Figure 4:
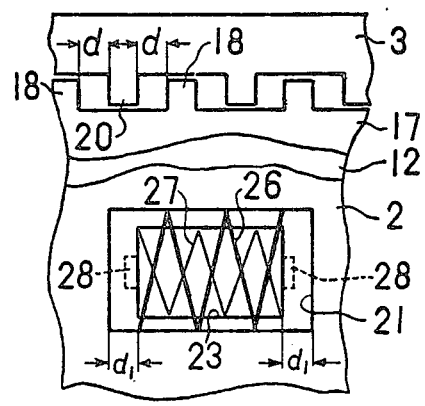
FIGS. 4, 5 and 6 are schematic enlarged view viewed in the direction of arrows IV—IV in FIG. 1 with certain parts cut away, respectively in different torsion angles.

When the torque is small and the torsion angle is less than 3°, only the small and thin springs 27a engage with the protrusions 38, and other springs 26 and 27 do not engage with the side edges of the openings 21 in the flanges 2. One spring 27a in each flange 2 is compressed and operates as a torque transmitting member. Therefore, as shown in characteristic line 0–e in FIG. 3, the torsion angle increases rapidly with a small increase of the torque, when the torsion angle is less than 3°. In this operation, since the side plates 11 twist with respect to the flanges 2, sliding occurs on the surfaces of the friction plates 37 having a small coefficient of friction, so that a small hysteresis torque h occurs in the characteristic 0–e in FIG. 3. The center plate 17 in FIG. 1 is connected to the side plates 12 by the friction washers 31 and the friction plates 32. The spaces d corresponding to the torsion angle of 3° are formed between the outer teeth 18 of the center plate 17 and the inner teeth 20 of the ring gear 3. Therefore, the center plate 17 travels together with the side plates 12 and twists with respect to the flanges 2. The situation when the torsion angle is zero is also illustrated in FIG. 4.

Figure 5:
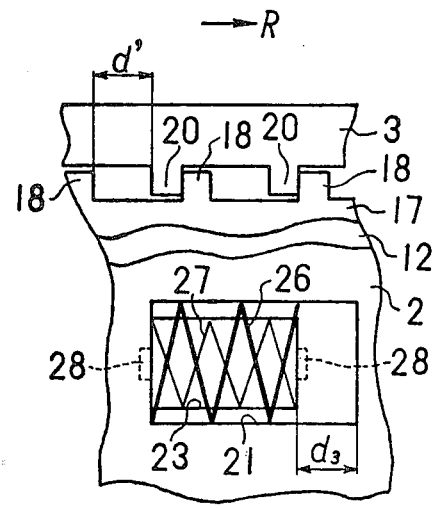

When the torsion angle reaches 3°, as shown in FIG. 5, all of the springs 26, 27 and 27a (in FIG. 2) contact with the side edges of the openings 21 in the flanges 2, and the inner teeth 20 of the ring gear 3 engage with the left faces in FIG. 5 of the outer teeth 18 of the center plate 17 along a rotating direction R.

When the torsion angle exceeds 3°, all of the springs 26, 27 and 27a are compressed. Therefore, as shown in a characteristic line f–g in FIG. 3, the increasing rate of the torque with respect to the torsion angle is high, and the torque $T_3$ (stopper torque) according to the maximum torsion angle 5.5° is very large. When the torsion angle is more than 3°, the center plate 17 in FIG. 1 is fixedly connected to the flanges 2 through the ring gear 3, and the center plate 17 as well as the sub-plates 31 which are connected to the center plate 17 twist with respect to the side plates 12. Therefore sliding occurs on the surfaces of the friction plates 32 having a large coefficient of friction, so that a large second hysteresis torque H occurs in the second characteristic f–g in FIG. 3. Since the springs 26 and 27 are pre-compressed when assembled, the torque increases from a value of $T_1$ to a value of $T_2$ when the torsion angle is 3°.

When the torsion angle reaches 5.5°, the pins 13 in FIG. 2 contact with the edges of the long apertures 15 in the flanges 2, so that further torsion is prevented.

Figure 6:
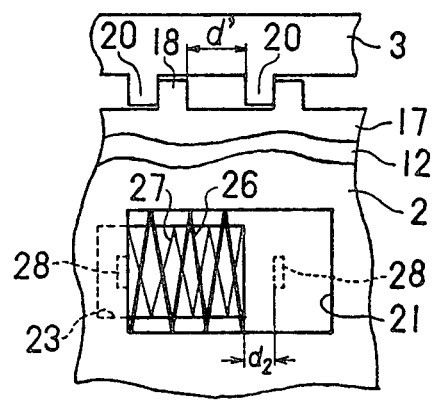

When the torque decreases to 0 kgm from the maximum value $T_3$, each member operates substantially in reverse, and the torsion angle decreases to 0°. During this decreasing operation, the hysteresis and the incline of the characteristic line in FIG. 3 change once. The center plate 17 operates as follows. In FIG. 6, the right (in FIG. 6) stoppers 28 of the center plate 17 are positioned apart from the compressed springs 26 and 27 with spaces $d_2$ corresponding to a torsion angle of 2.5°(5.5°–3°). While the members operate from the position in FIG. 6 to the position in FIG. 5, the springs 26 and 27 extend, and the side plates 12 travel rightward in FIG. 6, in other words, the flanges 2 travel leftward in FIG. 6, whereby the space $d_2$ decreases. During this operation, since each left stopper 28 and the left side edge of each opening 21 in the flanges 2 are in contact with the springs 26 (as in FIG. 5), the center plate 17 does not travel with respect to the flanges 2 and the ring gear 3, so that each right side face of the teeth 18 of the center plate 17 is spaced to the teeth 20 of the ring gear 3 with a space d' (d+d) corresponding to the torsion angle of 6° which is the same as in FIG. 6. While the torsion angle decreases from 3°, since the center plate 17 is fixedly connected to the side plates 12 through the stoppers 28 and the springs 26 and 27, the center plate 17 travels rightward together with the side plates 12 and the springs 26 and 27, in other words, only the flanges 2 travel leftward. Therefore, the spaces $d_1$ and d, both corresponding to the torsion angle of 3°, are formed between the stoppers 28 and the side edges of the openings 21 as well as between the inner teeth 20 and the outer teeth 18, respectively, so that each member returns to and occupies the initial position.

In the negative torque area, the members operate similarly as above and in the reverse direction.

According to the invention, as detailed hereinbefore, since two flanges 2 are provided with axial, space therebetween, the number of the torsion springs 25 doubles, so that the stopper torque $T_3$ can be increased, which is suitable and desirable for clutch discs employed in heavy duty vehicles. Since the number of the springs 25 increases, the pressure by each spring 25 against the side edges of the openings 21, 22 and 23 can be reduced, whereby wear of the side edges of the openings 21, 22 and 23 and the springs 25 is reduced, and durability increases. Since the whole thickness of the disc(an axial length between both side plates 12) increases, the members can be supported stably by each other and the hub 1. In the illustrated embodiment, since torsion angle - torque characteristic and the hysteresis h and H change, the torque vibration can effectively be absorbed both in the small torque area and the large torque area.

In modifications of the invention, two kinds of the spaces d and $d_1$ in FIG. 2 may be different to each other, so that the second torsion area and the second hysteresis area may be different. Three or more kinds of torsion springs may be employed, so that the torsion characteristic may change twice or more. Three or more flanges 2 may be employed.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed:

1. A damper disc comprising a hub splined to an output shaft; at least two axially spaced annular flanges rotatably fitted to an outer periphery of the hub; annular side plates arranged at both sides of each flange; torsion springs extending substantially in the disc rotating direction and disposed in openings formed in the flanges and the side plates, each pair of the side plates being connected to the adjacent flange by the torsion springs, one of each side plate pair being connected to the hub; and a torque input member including a ring gear connected to the flanges and an annular input plate having friction facings and being axially slidably connected to the ring gear.

2. A damper disc of claim 1, further comprising an annular center plate arranged between the axially inner side plates, said center plate having teeth which fixedly engage the torque input member upon a large torsion angle; friction members arranged between the center plate and the adjacent side plates, so that a large hysteresis torque may be produced upon the occurence of a large torsion angle; and other friction members arranged between the flanges and the axially outer side plates, so that a small hysteresis torque may be produced from the start of torsion operation.

3. A damper disc of claim 2, wherein the center plate is axially slidable with respect to the ring gear.

4. A damper disc comprising a hub splined to an output shaft; at least two axially spaced annular flanges rotatably fitted to an outer periphery of the hub; annular side plates arranged at both sides of each flange; torsion springs extending substantially in the disc rotating direction and disposed in openings formed in the flanges and the side plates, each pair of the side plates being connected to the adjacent flange by the torsion springs; a torque input member connected to the flanges; one of each side plate pair being connected to the hub; an annular center plate arranged between the axially inner side plates, said center plate having teeth which fixedly engage the torque input member upon a large torsion angle; friction members arranged between the center plate and the adjacent side plates, so that a large hysteresis torque may be produced upon the occurence of a large torsion angle; and other friction members arranged between the flanges and the axially outer side plates, so that a small hysteresis torque may be produced from the start of torsion operation.

5. A damper disc of claim 1 wherein said torsion springs comprises at least two kinds of springs, each kind having different spring characteristics, some of said springs being compressed after the torsion angle exceeds a predetermined area.

6. A damper disc of claim 4 comprising only two annular flanges.

7. A damper disc of claim 4 wherein said torque input member has friction facings which are positioned between a flywheel of an engine and a pressure plate.

* * * * *